Nov. 24, 1970　　　　　A. G. FOX　　　　　3,543,180
TRANSVERSE AND LONGITUDINAL MODE LOCKING IN OPTICAL MASERS
BY TRAVELING WAVE INTRACAVITY PHASE MODULATION
Filed May 13, 1968

INVENTOR
A. G. FOX
BY
David P. Kelley
ATTORNEY

United States Patent Office 3,543,180
Patented Nov. 24, 1970

3,543,180
TRANSVERSE AND LONGITUDINAL MODE LOCKING IN OPTICAL MASERS BY TRAVELING WAVE INTRACAVITY PHASE MODULATION
Arthur G. Fox, Rumson, N.J., assignor to Bell Telephone Laboratories, Incorporated, Murray Hill and Berkeley Heights, N.J., a corporation of New York
Filed May 13, 1968, Ser. No. 728,500
Int. Cl. H01s 3/00
U.S. Cl. 331—94.5
10 Claims

ABSTRACT OF THE DISCLOSURE

Transverse mode-locking and beam-scanning is accomplished in an optical maser by phase modulating the laser beam at a frequency equal to the transverse mode-separation frequency. The modulator may comprise a transparent dielectric medium disposed transversely in the resonator. Established in the medium, by either electric or acoustic means, is a traveling or standing wave of index of refraction which propagates along the crystal in step with the scanning optical beam provided the modulation frequency equals transverse mode-separation frequency. Simultaneous locking of both the transverse and longitudinal modes is achieved in a cavity resonator designed such that the longitudinal mode frequency separation is an integral multiple of the transverse mode frequency spacing.

BACKGROUND OF THE INVENTION

This invention relates to transverse mode-locking, simultaneous transverse and longitudinal mode-locking, and beam-scanning in optical masers.

One of the most promising uses of the laser is in the field of communications where the large bandwidths available at optical frequencies represent virtually unlimited information carrying capabilities. Information may be impressed upon an optical beam by well-known amplitude or frequency-modulation techniques, but pulse code modulation due to its obvious advantages is a preferred method and consequently has induced workers in the art to attempt to produce a CW pulsed laser, i.e., one whose output is a pulse train which could serve as the carrier in a pulse code modulation optical transmission system, the pulse train being encoded by the selective elimination of pulses in accordance with information to be conveyed.

Perhaps the most renowned success in achieving CW pulsed laser operation is attributed to L. E. Hargrove who discovered that the longitudinal modes of a laser phase-locked and produced a pulse train output when modulated at the mode-separation frequency. Hargrove's use of an acoustic intracavity modulator for this purpose is disclosed in an article entitled, "Locking of He-Ne Laser Modes Induced by Synchronous Intracavity Modulation," L. E. Hargrove et al., Applied Physics Letters 5, 4 (1964). Subsequently others have studied in detail the phase-locking phenomenon as it relates to the longitudinal modes of a laser. See, for example, "Characteristics of Mode Coupled Lasers," M. H. Crowell, IEEE, J. Quantum Electronics, QE–1, 12 (1965). It has been determined that longitudinal mode-locking causes the longitudinal energy distribution within the cavity resonator to be confined to a single packet of energy or pulse which bounces back and forth between the resonator mirrors producing an output pulse each time it strikes one of the mirrors. That is, the output is a train of pulses of repetition rate $c/2L$, where $c$ is the velocity of light and $2L$ is the round-trip path length. The pulse width is inversely related to the width of spectrum of the output, although the intracavity pulse is a packet of energy confined longitudinally, it is however not confined transversely to any particular region within the aperture of the system, i.e., the energy of the intracavity pulse may be distributed transversely over the entire system aperture.

The preoccupation of those skilled in the art with longitudinal mode-locking as a technique to derive a PCM carrier has resulted in little effort being expended to explore the feasibility and implications of phase-locking the transverse modes of an optical maser. Consequently, many of the implications of transverse mode-locking, such as beam-scanning, have not been appreciated by the skilled art workers. What little work has been reported has been directed toward self-locking of transverse modes, i.e., phase-locking has been observed in the absence of any modulation or other deliberate perturbation of the laser. See an article by K. Kohiyama et al., entitled "Self-Locking of Transverse Higher-Order Modes in a He-Ne Laser," Proceedings IEEE 56, 333 (1968). The observed self-locking, however, is neither predictable nor reliable and may easily switch to a regime of operation in which the transverse modes free-run. In contrast, the present invention is directed toward achieving forced phase-locking of the transverse modes (i.e., phase-locking achieved by some deliberate and controlled perturbation of the laser) and toward utilizing the phenomenon in beam-scanning devices.

SUMMARY OF THE INVENTION

Accordingly, transverse mode-locking of a particular symmetry set of transverse modes is achieved in a laser oscillator by an intracavity traveling wave of index of refraction which propagates transversely in the cavity resonator at the transverse mode-separation frequency. By symmetry set it is meant, for example, the set of TEM modes of rectangular symmetry, e.g., $TEM_{00}$, $TEM_{01}$, $TEM_{02}$, and so forth. Undesired modes, i.e., those not of the preselected symmetry set may be suppressed by the insertion of an appropriate aperture in the cavity resonator. The traveling wave of index of refraction is created in a transparent dielectric medium, which extends transversely across the cavity resonator by a traveling wave, either acoustic or electric, applied to the medium at a frequency equal to the transverse mode-separation frequency and preferably at a wavelength equal to approximately twice the side-to-side distance traveled by the beam. If the traveling wave is electric, then the medium is electrooptic, but if the traveling is acoustic, the medium need not be crystalline, e.g., it could be glass or water. Provided that only a single longitudinal mode is permitted to oscillate, the phase-locked transverse modes produce a time dependent energy distribution characterized by an elongated region of energy extending between the cavity resonator reflectors. The elongated region in cross section occupies only a small portion of the laser aperture and thus forms a spot of coherent light on the reflectors. Because the elongated region oscillates transversely in the resonator, in step with the transversely varying index of refraction, the spot scans across the reflectors, which may be made partially transmissive so that the spot may scan an appropriate utilization device such as an optical memory matrix. A pair of mutually orthogonal phase modulators would enable two orthogonal symmetry sets of transverse modes to be locked. Two dimensional scanning would thus be obtained.

Similarly, simultaneous transverse and longitudinal mode-locking is achieved in a laser oscillator oscillating in a plurality of longitudinal and transverse modes. If the laser resonator is designed such that the longitudinal mode-separation frequency is equal to an integral multiple of the transverse mode-separation frequency and, if the intracavity beam is phase modulated, as described above, at the transverse mode-separation frequency, then both the longitudinal and transverse modes will phase lock. The consequent energy distribution is a packet of pulse of energy which bounces back and forth between the resonator reflectors, propagating in a zig-zag path in both a longitudinal and a transverse direction simultaneously.

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Figure 1A:
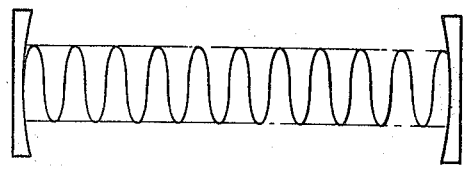
FIGS. 1A, 1B, 1C, and 1D are schematics showing the energy distribution in unlocked, longitudinally-locked, transversely-locked, and simultaneous transversely and longitudinally locked conditions.
Figure 1B:
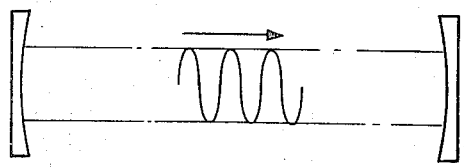

Before discussing the invention in detail, it may be helpful to consider first the energy distribution in a laser cavity resonator in its several locked and unlocked mode conditions. In FIG. 1A there is shown the energy distribution or longitudinal beam shape for an unlocked laser. The energy is distributed throughout both the longitudinal and transverse dimensions of the cavity, the latter being limited by the effective aperture of the system. If the longitudinal modes of the laser are phase-locked, the energy would still be distributed throughout the transverse dimension, but would be confined to only a narrow packet or pulse of energy in the longitudinal dimension as shown in FIG. 1B. This packet or pulse of energy oscillates in the longitudinal direction, bouncing back and forth between the resonator reflectors. Each time the pulse strikes one of the mirrors, e.g., the right-hand mirror, it produces a pulse output—one pulse every $2L/c$ seconds.

Figure 1C:
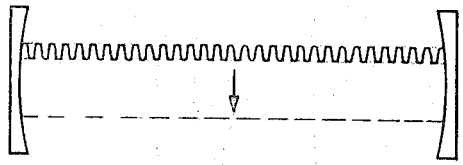

By contrast, if a symmetry set of the transverse modes of a single longitudinal mode-laser are phase-locked, the energy is distributed uniformly throughout the longitudinal dimension, but is confined in the transverse dimension to a narrow elongated region, as shown in FIG. 1C, which oscillates transversely at the transverse mode-separation frequency $\Delta f_T$. If the reflector is partially transmissive, the output is a beam of light which scans back and forth across the output reflector.

Figure 1D:
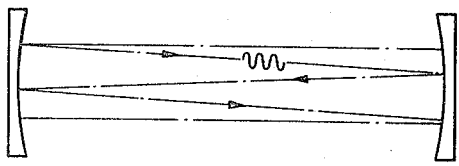

In a multilongitudinal and multitransverse mode-laser, if both the longitudinal and transverse modes are simultaneously phase-locked, the energy distribution, as shown in FIG. 1D, is confined to a packet or pulse of energy which propagates both longitudinally and transversely along a zig-zag path.

Figure 2A:
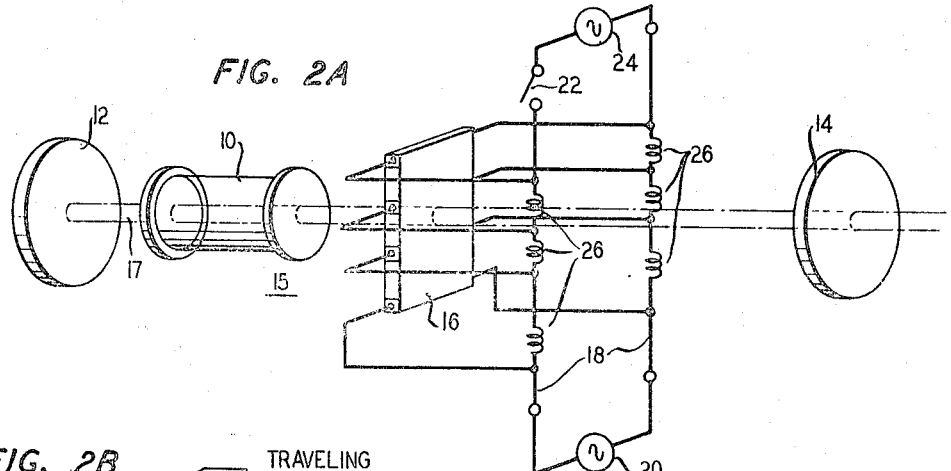
FIG. 2A is a schematic of an illustrative embodiment of the invention.

Turning now to FIG. 2A there is shown an illustrative embodiment of a beam scanner in accordance with the invention comprising an active laser medium enclosed in a container 10 disposed in a cavity resonator formed by a pair of spaced concave reflectors 12 and 14, the latter being partially transmissive to permit egress of energy from the cavity. A phase modulator 15 is disposed within the resonator, the modulator comprising an elongated electrooptic crystal 16, such as KDP, oriented transversely, and a plurality of electrodes being disposed on opposite faces of the crystal so as to produce an electric field normal to the direction of propagation of the light beam 17. In KDP, for example, the field would be parallel to the crystallographic c-axis, the beam propagation would be along the $y'$ axis and the light would be polarized along the $x'$ axis. In general, the field is applied along the appropriate axis of the electrooptic crystal so as to induce changes therein of index of refraction, and the light is polarized along an induced principal optic axis of the crystal.

Figure 2B:
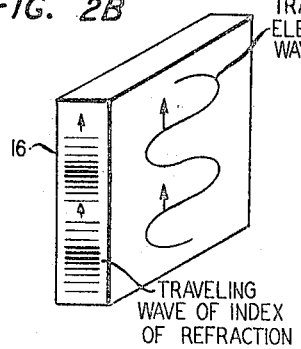
FIG. 2B is a schematic of the crystal of FIG. 2A showing the various related traveling waves.

As shown in FIG. 2B, a traveling electric wave is created in the crystal by connecting opposite electrode pairs at periodic points across a transmission line 18 which is driven by a signal source 20. The line 18 may of course be open wire coaxial, or any other suitable means of creating the traveling electric wave. The traveling electric wave produces a traveling wave of index of refraction which propagates in the crystal and thereby phase modulates the light beam passing therethrough. Thus, different portions of the beam (originally shown in FIG. 1A) experience different phase or frequency shifts. Only that portion of the beam which is in step with a region of zero frequency shift (i.e., region of maximum or minimum index of refraction) will be permitted to exist. All other portions of the beam will experience some finite frequency shift each time it passes through a nonzero frequency shift region of the modulator. These portions are therefore continually shifted in frequency until outside the laser bandwidth at which point they no longer experience gain and are, therefore, not permitted to exist.

In order that this technique produce phase-locking of the transverse modes with the attendant "elongated" energy distribution shown in FIG. 1C, it is desirable that the modulation frequency of source 20 be equal to the transverse mode-separation frequency and preferably that the modulation wavelength in the crystal should be equal to twice the side-to-side distance traveled by the beam. Under such conditions, the modulation efficiency is optimized. However, inasmuch as the velocity of propagation on the transmission line is constant, whereas the velocity of the transverse motion of the beam is nearly simple harmonic, it is difficult to synchronize the two. This effect may be minimized by periodic loading of the line 18 by inductors 26, as shown in FIG. 2A, in order to control the velocity on the line.

Another technique which is useful to produce transverse mode-locking by phase modulation is to create a standing wave in the crystal 16, as by closing switch 22 on signal source 24 which also produces a field at the transverse mode-separation frequency. The oppositely propagating fields at the same frequency produce the standing wave, but in effect the beam while propagating in one direction interacts with the field traveling in the same direction, whereas when the beam propagates on its back swing in the opposite direction, it interacts with the other traveling wave in the manner, as previously described, for a single traveling wave.

The invention as described with reference to FIG. 2A may also be utilized to phase-lock simultaneously both the longitudinal and transverse modes of a laser ocsillator provided that the cavity resonator formed by reflectors 12 and 14 is designated such that the longitudinal mode separation frequency $\Delta f_L$ is an integral multiple of the transverse mode separation frequency $\Delta f_T$, i.e., $\Delta f_L = N\Delta f_T$ and provided that the electrooptic crystal 16 is driven at the transverse mode separation frequency.

In general, the cavity resonator is designed to satisfy approximately the relationship $$R = \frac{L}{1 - \cos\frac{\pi}{N}} \qquad (1)$$

where R is the radius of curvature of the reflectors, L is the distance between the reflectors, and $N = \Delta f_L/\Delta f_T$, an integer.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Figure 2C:
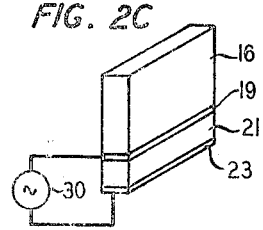
FIG. 2C is a schematic of modulator using acoustic drive.

In particular, the entrance face of crystal 16 may be coated with antireflection coatings to minimize reflection loss; and, the modulation may be acoustic by merely converting the applied electric field to an acoustic wave (as shown in FIG. 2C) by the use of a transducer 21 (e.g., piezoelectric crystal such as CdS) coupled to one end of the crystal 16.

What is claimed is:
1. An optical beam scanner comprising
   a laser oscillator having a cavity resonator in which oscillations of coherent light occur in a plurality of transverse modes, the mode resonances being uniformly separated in frequency, and
   means for phase modulating the transverse modes comprising means for creating in said resonator at least one traveling wave of index of refraction propagating therein transversely at a frequency substantially equal to the uniform transverse mode of separation frequency, thereby to cause the transverse modes to phase lock.
2. The optical beam scanner of claim 1 wherein said means for creating at least one traveling wave comprises
   an electrooptic crystal extending transversely in said resonator and disposed therein to intercept the light oscillations,
   a transmission line coupled to said crystal for producing therein an electrical field in a direction so as to induce changes in index of refraction in said crystal, and
   means for applying to one end of said transmission line an electrical signal of frequency equal to the transverse mode separation frequency.
3. The optical beam scanner of claim 2 in combination with means for creating a standing wave in said crystal comprising means for applying to the other end of said transmission line an electrical signal of frequency equal to the transverse mode separation frequency.
4. The optical beam scanner of claim 2 wherein the mode locking produces a time dependent distribution of energy which has a transverse component of propagation in said resonator and in combination with means for reducing the difference between the velocity of the traveling wave and the velocity of transverse component of propagation of the energy distribution comprising means for loading said transmission line.
5. The optical beam scanner of claim 2 wherein the light oscillations are polarized along an induced principal optic axis of said crystal.
6. The optical beam scanner of claim 2 wherein said crystal comprises KDP, the light oscillations being polarized either along the crystallographic $x'$ or $y'$ axes and the field vector is directed along the crystallographic $c$-axis, the latter being normal to the direction of light propagation.
7. The optical beam scanner of claim 1 in combination with means for restricting said laser oscillator to oscillation primarily in a preselected symmetry set of transverse modes.
8. The optical beam scanner of claim 1 wherein said traveling wave creating means comprises a transparent dielectric medium disposed transversely in said resonator, an acoustic transducer coupled to said medium, and means for applying to said transducer an electric field of frequency equal to the transverse mode separation frequency.
9. The optical beam scanner of claim 1 wherein said laser oscillator comprises a cavity resonator in which oscillation of coherent light occur in a plurality of transverse modes, each being uniformly separated by a frequency $\Delta f_T$, and in a plurality of longitudinal modes, each being uniformly separated by a frequency $\Delta f_L$,
   said sesonator being designed such that $\Delta f_L$ is an integral multiple of N of $\Delta f_T$, and
   said phase modulating means thereby causing the transverse and longitudinal modes to phase-lock simultaneously.
10. The optical beam scanner of claim 9 wherein said resonator comprises a pair of spaced reflectors designed to satisfy approximately the relationship

$$R = \frac{L}{1 - \cos \frac{\pi}{N}}$$

where R is the radius of curvature of the reflectors and L is the distance between the reflectors.

References Cited
UNITED STATES PATENTS 3,426,286    2/1969    Miller _____ 331—94.5

OTHER REFERENCES

Abston, "IEEE Journal of Quantum Electronics," July 1968, pp. 471–473.

ROY LAKE, Primary Examiner

D. R. HOSTETTER, Assistant Examiner

U.S. Cl. X.R.

350—160